United States Patent
Barrow et al.

(10) Patent No.: US 7,920,862 B2
(45) Date of Patent: *Apr. 5, 2011

(54) SYSTEM AND METHOD FOR IMPROVED IMEI REGISTRATION

(75) Inventors: Steven Wesley Barrow, South Riding, VA (US); Manish Sharma, Fairfax, VA (US); Anthony Wei-Hsia Soong, Fairfax, VA (US)

(73) Assignee: Nextel Communications, Inc., Reston, VA (US)

( * ) Notice: Subject to any disclaimer, the term of this patent is extended or adjusted under 35 U.S.C. 154(b) by 600 days.

This patent is subject to a terminal disclaimer.

(21) Appl. No.: 11/523,862

(22) Filed: Sep. 19, 2006

(65) Prior Publication Data

US 2007/0015505 A1    Jan. 18, 2007

Related U.S. Application Data

(63) Continuation of application No. 11/098,259, filed on Apr. 4, 2005, now Pat. No. 7,139,573.

(51) Int. Cl.
*H04Q 7/20* (2006.01)

(52) U.S. Cl. .................. 455/432.2; 455/435.1; 455/433; 370/252

(58) Field of Classification Search ........... 455/435.1–2, 455/439, 433, 450, 414.1, 464, 435.2, 2; 370/252, 437

See application file for complete search history.

(56) References Cited

U.S. PATENT DOCUMENTS

| | | | | |
|---|---|---|---|---|
| 5,815,506 A | * | 9/1998 | Gokhale | 370/524 |
| 5,884,172 A | * | 3/1999 | Sawyer | 455/435.1 |
| 6,512,923 B2 | * | 1/2003 | Pallas et al. | 455/435.1 |
| 6,597,910 B1 | * | 7/2003 | Ra | 455/433 |
| 7,499,703 B2 | * | 3/2009 | Zhang et al. | 455/435.1 |
| 2005/0020262 A1 | * | 1/2005 | Kim | 455/435.1 |
| 2005/0037753 A1 | * | 2/2005 | Andersen et al. | 455/435.2 |
| 2006/0019681 A1 | | 1/2006 | Harris et al. | |
| 2006/0050646 A1 | * | 3/2006 | Champion et al. | 370/252 |
| 2007/0149178 A1 | * | 6/2007 | Thorson et al. | 455/414.1 |
| 2007/0153777 A1 | * | 7/2007 | Coulas et al. | 370/356 |

* cited by examiner

*Primary Examiner* — Congvan Tran

(57) ABSTRACT

Methods and systems for IMEI registration are provided. In accordance with exemplary embodiments of the present invention, when an IMEI registration fails due to a network failure, the mobile station implements a back-off algorithm for future IMEI registration attempts. Specifically, the present invention provides a back-off algorithm which determines a different amount of time for the time period between each unsuccessful IMEI registration.

17 Claims, 5 Drawing Sheets

SYSTEM AND METHOD FOR IMPROVED IMEI REGISTRATION

CROSS-REFERENCE TO RELATED APPLICATION

This application is a continuation of application Ser. No. 11/098,259, filed Apr. 4, 2005, which claims priority from U.S. provisional patent application Ser. No. 60/608,907, filed on Sep. 13, 2004.

FIELD OF THE INVENTION

This invention relates generally to international cellular telephone communications networks and in particular to reducing network traffic and congestion in the event of a network failure.

BACKGROUND OF THE INVENTION

In the current Integrated Digital Enhanced Network (iDEN) technology, a subscriber unit will perform International Mobile Equipment Identifier (IMEI) registration in order to obtain its International Mobile Subscriber Identifier (IMSI) under two scenarios: during initial power-up of the subscriber unit when it does not have an IMSI; and when the subscriber unit has been configured to perform a master reset, which will result in the subscriber unit not having an IMSI.

If a subscriber unit has not successfully performed IMEI registration, it will not have an IMSI and it will not be able to perform any iDEN-related services, such as dispatch, interconnect, and packet data transfer. There are typically two different scenarios when an iDEN subscriber unit fails IMEI registration with the iDEN network—when the subscriber unit's IMEI is not provisioned on the iDEN carrier's network and when there is a network failure.

When a network failure occurs, the iDEN network (i.e., DAP and/or HLR) sends a NETWORK_FAILURE message to the subscriber unit. In this scenario, the iDEN subscriber unit will scan its bandmap to find an iDEN cell site or iDEN network that may accept its IMEI registration, and then retry the IMEI registration approximately 25-35 seconds later. The iDEN subscriber unit will continue to retry the IMEI registration procedure every 25-35 seconds thereafter, provided that it continues to receive a NETWORK_FAILURE message from the iDEN network. In the case of a large number of users all trying IMEI registration every 25-35 seconds without success, this can cause a dramatic increase in the amount of (needless) network traffic over the system. Thus, there is a need for a system and method which overcomes the aforementioned drawbacks to the IMEI registration process.

SUMMARY OF THE INVENTION

Systems and methods for improved subscriber unit IMEI registration are provided. In one embodiment, a method includes transmitting an equipment identifier over a network, determining if a subscriber identifier has been received in response to the transmitted equipment identifier, and if not, determining a wait period based on a number of previous attempts to register the subscriber unit with the network. In one embodiment, the method further includes re-transmitting the equipment identifier over the network after the wait period has elapsed.

DETAILED DESCRIPTION OF THE EXEMPLARY EMBODIMENTS

One aspect of the invention is directed to the failure of a subscriber unit to successfully perform an IMEI registration. In one embodiment, the subscriber unit may implement a so-called "back-off" procedure whenever it fails IMEI registration due to a network failure. Instead of repeatedly retrying IMEI registration every 25-35 seconds, in accordance with one embodiment, the subscriber unit may delay subsequent attempts to register when it fails to successfully perform an IMEI registration. The net effect is a reduction in network traffic between the dispatch call controller (i.e., DAP) and the home location register (HLR).

When a subscriber unit fails IMEI registration because of a possible network failure or problem on the carrier's network, a network failure message is sent to the subscriber unit. Upon receipt of the network failure message from the network, the subscriber unit may implement the back-off procedure before attempting to retry the IMEI registration. In one embodiment, the subscriber unit may wait approximately 30 seconds before retrying a second attempted IMEI registration. If the subscriber unit again receives a network failure message from the network after sending the second IMEI registration request, the subscriber unit may then wait approximately 60 seconds before retrying a third attempted IMEI registration request (e.g., effectively doubling the wait time between the second and third try as compared to the wait time between the first and second try). In this fashion, the subscriber unit may continue to attempt IMEI registration, while increasing the wait time between each subsequent attempt. In one embodiment, this process continues until either the subscriber unit has successfully completed IMEI registration, or until the back-off procedure has expired. In another embodiment, when the back-off procedure has expired, the subscriber unit will restart the procedure.

In another exemplary embodiment, the IMEI registration and implementation of the back-off procedure proceeds as above, with the exception that the time-out period is a randomly-determined time interval.

Figure 1:
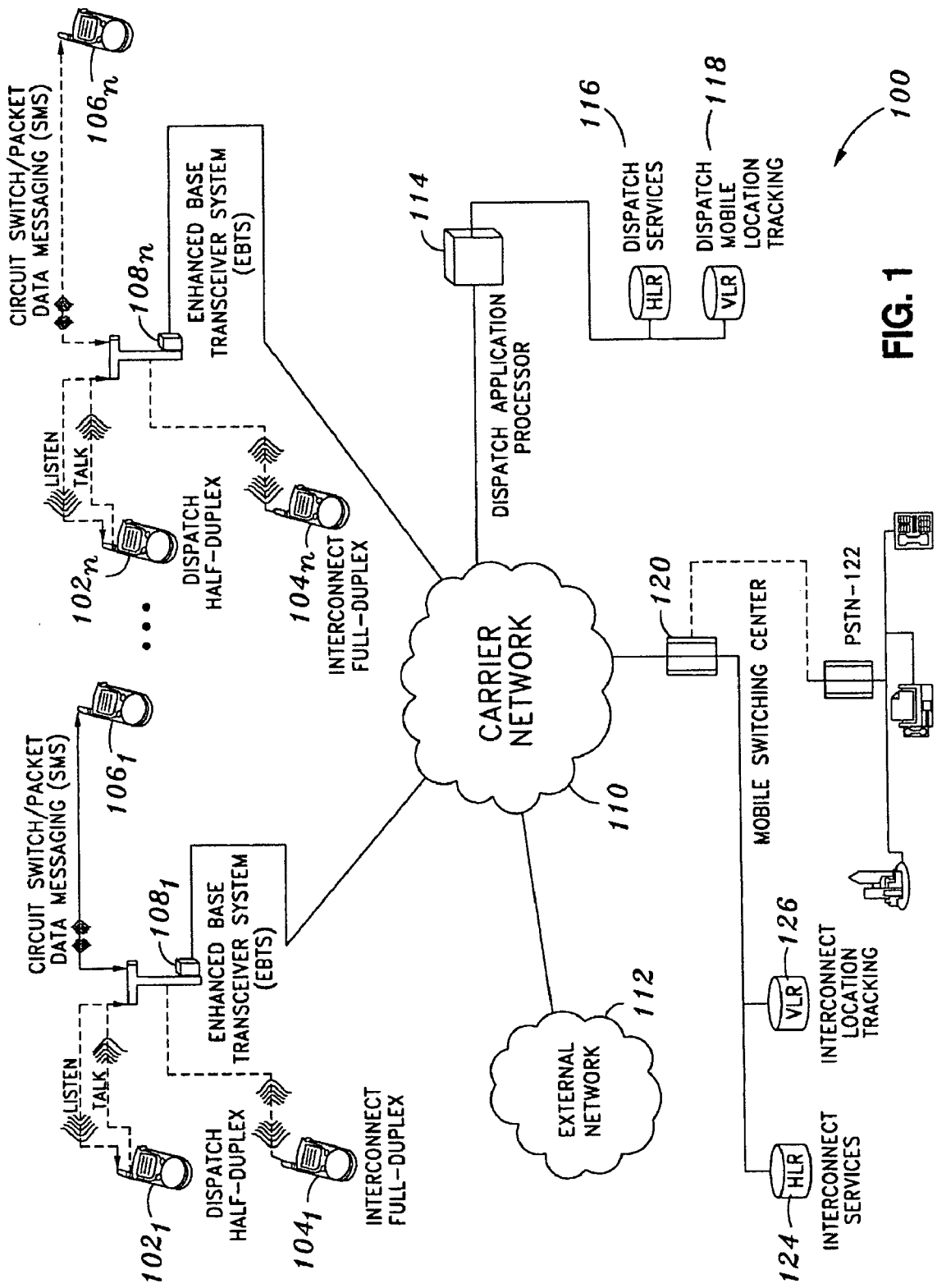
FIG. 1 depicts one embodiment of a system diagram of a communication system, on which one or more aspects of the invention may be implemented.

Referring now to the figures, FIG. 1 illustrates a block diagram of an exemplary communication system 100 in which one or more aspects of the invention may be implemented. In one embodiment, the communication system 100 is an iDEN system, such as the iDEN network owned and operated by Nextel Communications Inc. of Reston, Va. As shown in FIG. 1, the communication system 100 serves a plurality of dispatch subscriber units $102_1$-$102_n$, a plurality of interconnect subscriber units $104_1$-$104_n$, and a plurality of SMS subscriber units $106_1$-$106_n$ (collectively, "subscriber units 102-106"), all of which may communicate with a plurality of local base stations $108_1$-$108_n$.

In the case of dispatch subscriber units $102_1$-$102_n$, base stations $108_1$-$108_n$ may provide half-duplex voice service, thereby allowing users to communicate with each other (or with external entities) by way of half-duplex voice. In the case of interconnect subscriber units $104_1$-$104_n$, base stations $108_1$-$108_n$ may provide full-duplex voice service, thereby allowing users to communicate with each other (or with external entities) by way of full-duplex voice. And in the case of SMS subscriber units $106_1$-$106_n$, base stations $108_1$-$108_n$ may allow users to transmit circuit switch/packet data with each other (or with external entities). For discussion purposes, the various subscriber units of FIG. 1 will be referred to hereinafter as subscriber units 102-106. The subscriber units are the end-user interface to the communication network 100. It should be appreciated that subscriber units 102-106 may be comprised of phones, pagers, modems, mobile transceivers, personal digital assistants, end-user base transceivers, or similar devices capable of communicating over the carrier network 110. Subscriber units 102-106 may be capable of dispatch calling, interconnect calling, roaming, message mail and/or data communications.

Base stations $108_1$-$108_n$ may be comprised of base station radios and control equipment contained in an Enhanced Base Transceiver System (EBTS), or cell site. Such cell sites may be used to provide the RF link between the carrier network 110 and the various subscriber units 102-106. Cell sites may further provide connectively between subscriber units 102-106 and an external network 112. The external network 112 may be the Internet, a wide area network (WAN), a local area network (LAN), an intranet, or other type of packet-switch network. In another embodiment, external network 112 may be another carrier network.

As depicted in FIG. 1, communication system 100 further includes a Dispatch Application Processor (DAP) 114. In one embodiment, the DAP 114 may coordinate and control dispatch and packet data services. Moreover, the DAP 114 may provide first-time registration for all interconnect and dispatch subscribers, as well as maintenance and tracking of subscriber mobility for dispatch and packet data.

In one embodiment, the Dispatch Home Location Register (D-HLR) 116 is a database that stores information about dispatch access rights and features allocated to each subscriber unit 102-106. The D-HLR 116 may be queried each time a dispatch call is initiated or call features requested, which may function as a subscriber access control mechanism. For each dispatch subscriber unit $102_1$-$102_n$, the D-HLR database 116 may contain an International Mobile Equipment Identifier (IMEI), a billing number or International Mobile Subscriber Identity (IMSI), as well as other dispatch-related group and fleet ID information. Additional individual service provider policies and procedures may also be contained in the D-HLR 116.

Continuing to refer to FIG. 1, the communication system 100 is further depicted as including a DAP—Visited Location Register (D-VLR) 118. In one embodiment, the D-VLR 118 is a Random Access Memory (RAM) resident database that contains the most recent location information on each subscriber unit 102-106. As a subscriber unit 102-106 moves out of an area, it will report its new location to the DAP, which in turn may update the D-VLR 118. In one embodiment, the D-VLR 118 may contain the identification data for the subscriber unit in question, as well as subscriber data and the current status of the subscriber unit.

As shown in FIG. 1, the communication system 100 further includes a mobile switching center (MSC) 120 which provides interconnect services. In one embodiment, the MSC 120 functions as the interface between the carrier network 110 and other service provider's public switch telephone networks (PSTN) 122. While FIG. 1 depicts a single PSTN 122 coupled to the MSC 120, it should of course be understood that numerous MSCs 120 may similarly be coupled thereto.

During an interconnect call, subscriber units 102-106 must be validated by the Home Location Register (HLR) database 124. It should be appreciated that the HLR 124 may exist as a separate system or as an integrated part of the MSC 120. In one embodiment, the HLR 124 is used to maintain usage data, billing data, and service data for each subscriber units 102-106. In short, the HLR 124 ensures that the services to which each subscriber unit 102-106 subscribes, are maintained throughout the communication network 100.

Subscriber units 102-106 may be tracked via Interconnect Location Areas (ILAs) which are defined based on the coverage area of the base stations $108_1$-$108_n$. Such location data must be up-to-date and, as such, may be stored in the VLR 126. In one embodiment, the VLR 126 maintains the recent location area for each subscriber unit 102-106.

Figure 2A:
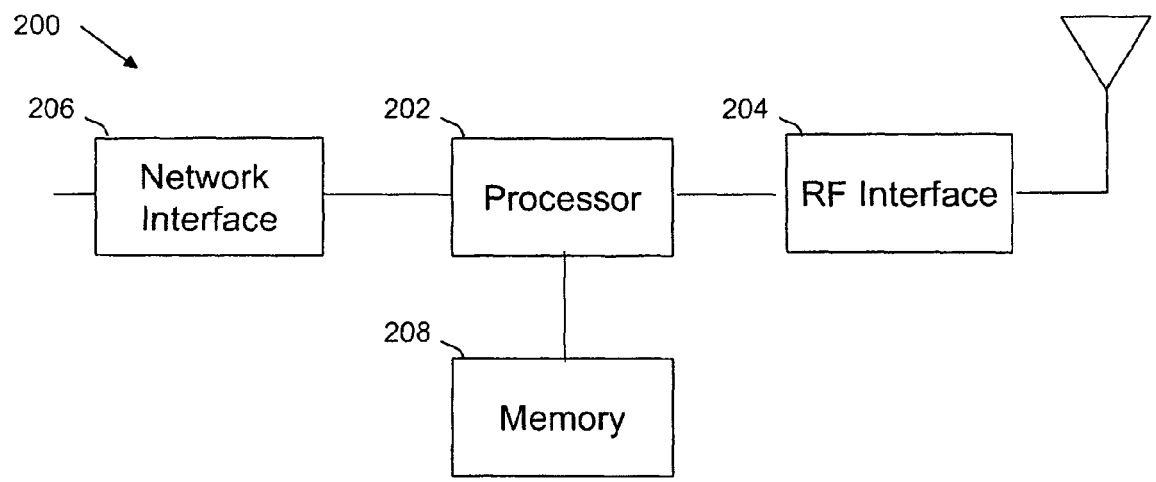
FIG. 2A is a simplified schematic diagram of one embodiment of a base station of FIG. 1.

FIG. 2A illustrates an exemplary block diagram of one of base stations $108_1$-$108_n$ in accordance with another embodiment of the invention. In particular, base station 200 comprises a processor 202, an RF interface 204, a network interface 206, and a memory 208. In one embodiment, the processor 202 performs the various operations of base stations $108_1$-$108_n$ as discussed above with reference to FIG. 1. The network interface 206 provides the base station 200 an interface to the carrier network 110 to receive communications from and send communications to other subscriber units 102-106 and/or external network 112. The RF interface 204, including the antenna, provides the base station 200 an interface to the wireless medium to receive communications from and send communications to subscriber units 102-106. The memory 208, serving generally as a computer readable medium, stores one or more software modules that control the processor 202 in performing its various operations.

It should further be appreciated that FIG. 2A is but a simplified diagram of base station 200. In another embodiment, base station 200 may further include, among other things, an access control gateway (ACG), one or more base radios, an RF distribution system (RFDS), a site synchronization global positioning system (GPS) receiver and a local area network (LAN) interface.

Figure 2B:
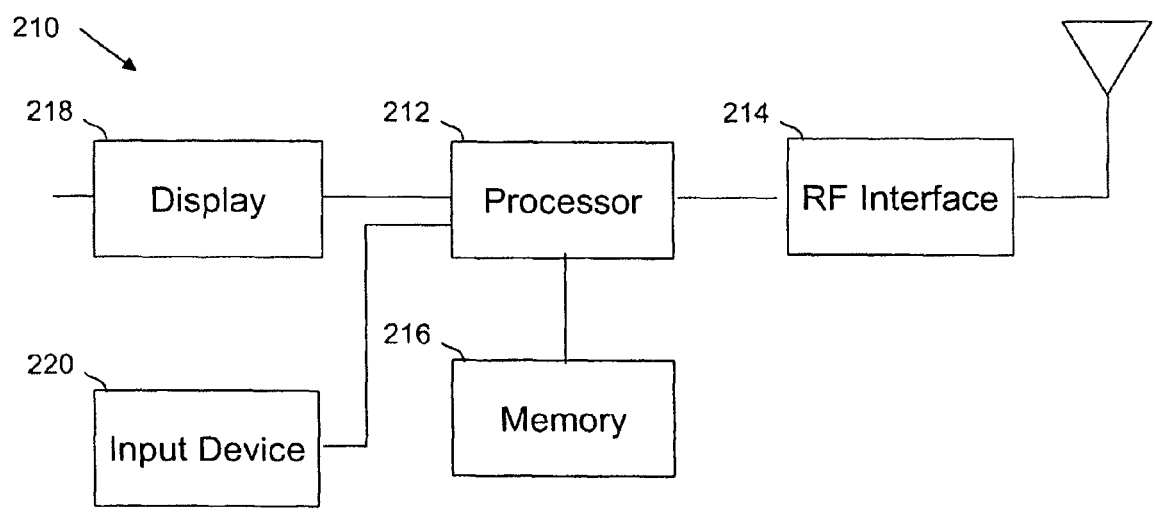
FIG. 2B is a simplified schematic diagram of one embodiment of a subscriber unit of FIG. 1.

FIG. 2B illustrates an exemplary block diagram of one of the subscriber units 102-106 in accordance with another embodiment of the invention. In particular, the subscriber unit 210 comprises a processor 212, an RF interface 214, a memory 216, a display 218, and an input device 220. In one embodiment, the processor 212 performs the various operations of the subscriber units 102-106 as discussed above with reference to FIG. 1. The RF interface 214, including the antenna, provides the subscriber unit 210 an interface to the wireless medium to receive communications from and send communications to base stations $108_1$-$108_n$. The memory 216, serving generally as a computer readable medium, stores one or more software modules that control the processor 212 in performing its various operations. The display 218 provides visual information to the user. The input device 220 allows a user to provide information to the processor 212. It shall be understood that the display 218 and input device 220 may be an integrated unit, such as a touch-sensitive screen.

Figure 3:
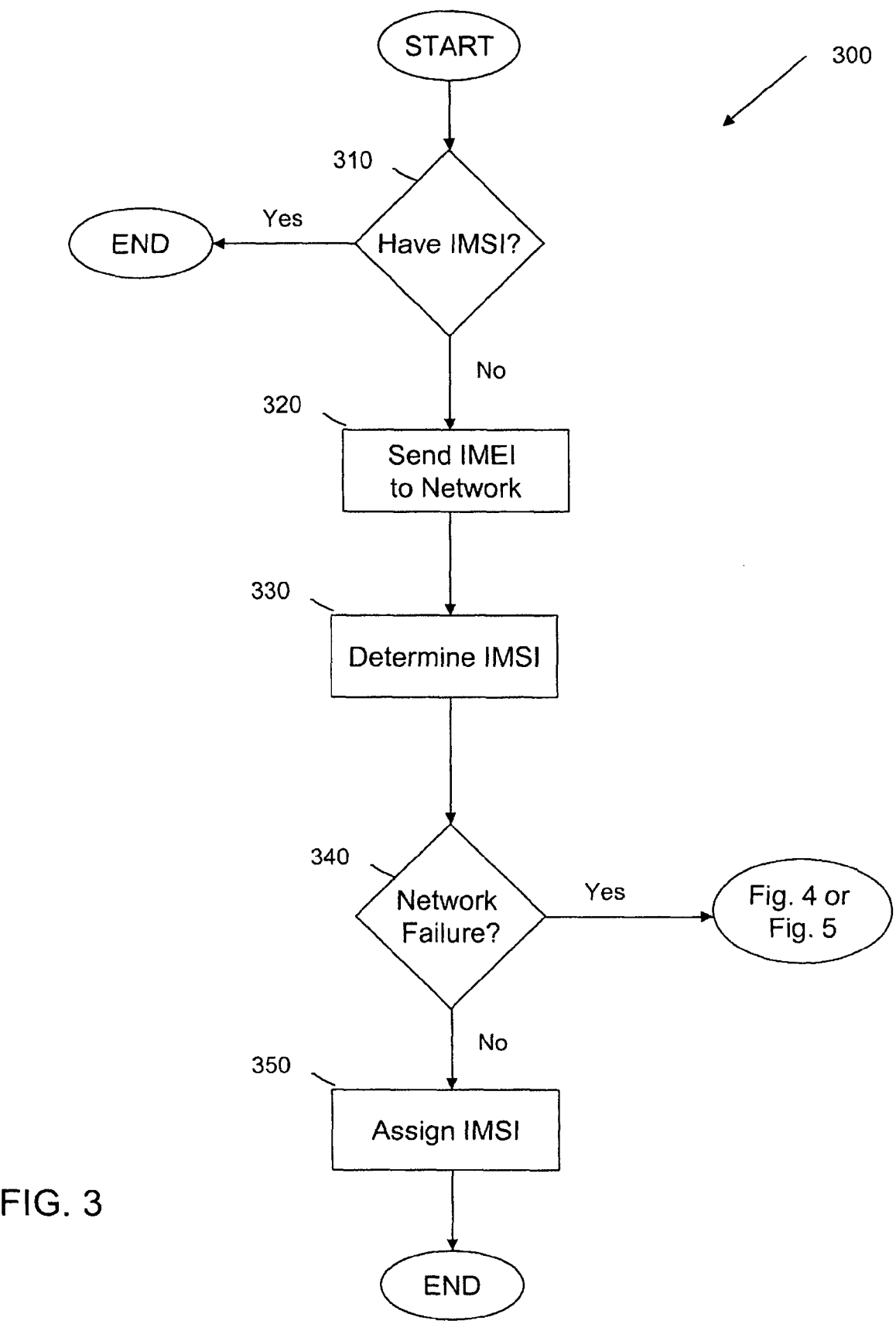
FIG. 3 depicts one embodiment of a flow diagram for the procedure of IMEI registration on a carrier network, consistent with the principles of the invention.

Referring now to FIG. 3, depicted is one embodiment of a process 300 for how one of subscriber units 102-106 may register with communication network 110. In particular, process 300 describes an IMEI registration procedure in accordance with the principles of the invention. In the embodiment of FIG. 3, process 300 starts and determines at block 310 whether the subscriber unit in question presently has its IMSI. If so, process 300 ends. Otherwise, process 300 continues to block 320 where the subscriber unit sends its IMEI to the network, which in one embodiment is carrier network 110. As described in detail above with reference to FIG. 1, the subscriber unit (e.g., subscriber unit 102-106) may communicate with the carrier network 110 via one of base stations $108_1$-$108_n$.

Thereafter, at block 330 of process 300, the network may accept the provided IMEI and attempt to determine the appropriate IMSI for the subscriber unit, hence completing the registration process. However, process 300 first determines at block 340 if a network failure message was received by the subscriber unit. In one embodiment, such a network failure message may be transmitted to the subscriber unit via one of base stations $108_1$-$108_n$. If a network failure message was not received, process 300 will continue to block 350 where the IMSI is sent and assigned to the subscriber unit in question. If, on the other hand, a network failure message is received by the subscriber unit (e.g., subscriber unit 102-106), process 300 may then continue to either the process 400 of FIG. 4, according to one embodiment, or the process 500 of FIG. 5, according to another embodiment.

Figure 4:
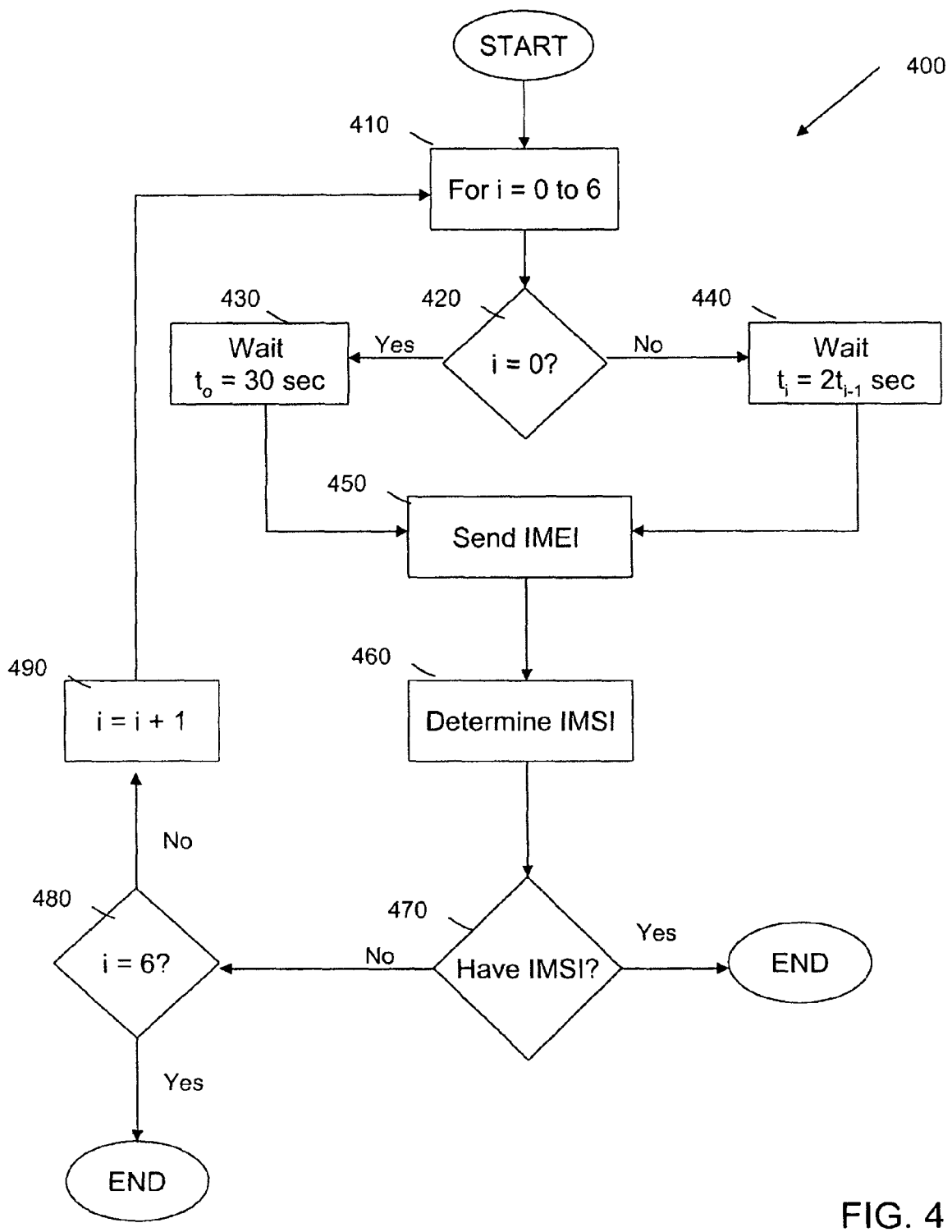
FIG. 4 is a flow diagram for one embodiment of how the IMEI registration process may be performed consistent with the principles of the invention.

Referring now to FIG. 4, depicted is one embodiment of a process 400 for implementing the back-off procedure discussed above. In one embodiment, process 400 is implemented by one of the subscriber units 102-106 as part of the IMEI registration process with carrier network 110. At block 410, process 400 begins a logical loop 420-490 to step a counter, i, from 0 to 6 in increments of 1. It should be appreciated that in other embodiments, the logical loop 420-490 may step through more or fewer increments. At block 420, a determination is made as to whether i=0. If so, process 400 there is no wait time (block 430) and process 400 will immediately proceed to block 450. Otherwise, process 400 continues to block 440 where it waits for a time $t_0$ seconds, where $t_0$ is the time interval for the current iteration of loop 420-490. When i=1, the wait time in this embodiment will be 30 seconds. Each subsequent iteration will see the wait time increase by 30 seconds over the wait time for the previous iteration (e.g., 30 sec, 60 sec, 90 sec, 120 sec, etc.). In another embodiment, the wait time $t_0$ may be doubled for each iteration (e.g., 30 sec, 60 sec, 120 sec, 240 sec, etc.). It should equally be appreciated that the wait time may increase for a given iteration at a rate that is either greater than or less than twice the time interval for the previous iteration.

Once process 400 has decided upon a time interval, it then proceeds to wait for this time interval before then continuing to block 450, at which point the subscriber unit in question will send its IMEI to the network. As previously mentioned, in one embodiment the subscriber unit is one of subscriber units 102-106, and the IMEI is transmitted to the carrier network 110 via one of base stations $108_1$-$108_n$. Once the network receives the subscriber unit's IMEI, at block 460 the network will attempt to determine the appropriate IMSI for the subscriber unit to complete the attempted IMEI registration process.

At this point in process 400, a determination should be made as to whether an IMSI has in fact been obtained from the network (block 470); if so, then the IMEI registration process is complete and process 400 will end. Otherwise, process 400 will determine at block 480 if the counter, i, has reached the predetermined maximum value (e.g., 6). If so, then process 400 ends. In one embodiment, after ending process 400 may reinitiate and begin again at block 410. If, on the other hand, the counter has not reached the predetermined maximum, the counter, i, will be incremented at block 490 and process 400 will revert to block 410. Moreover, the wait time may be increased by some rate (e.g., 30 seconds, double previous wait time, etc.) at block 490.

Figure 5:
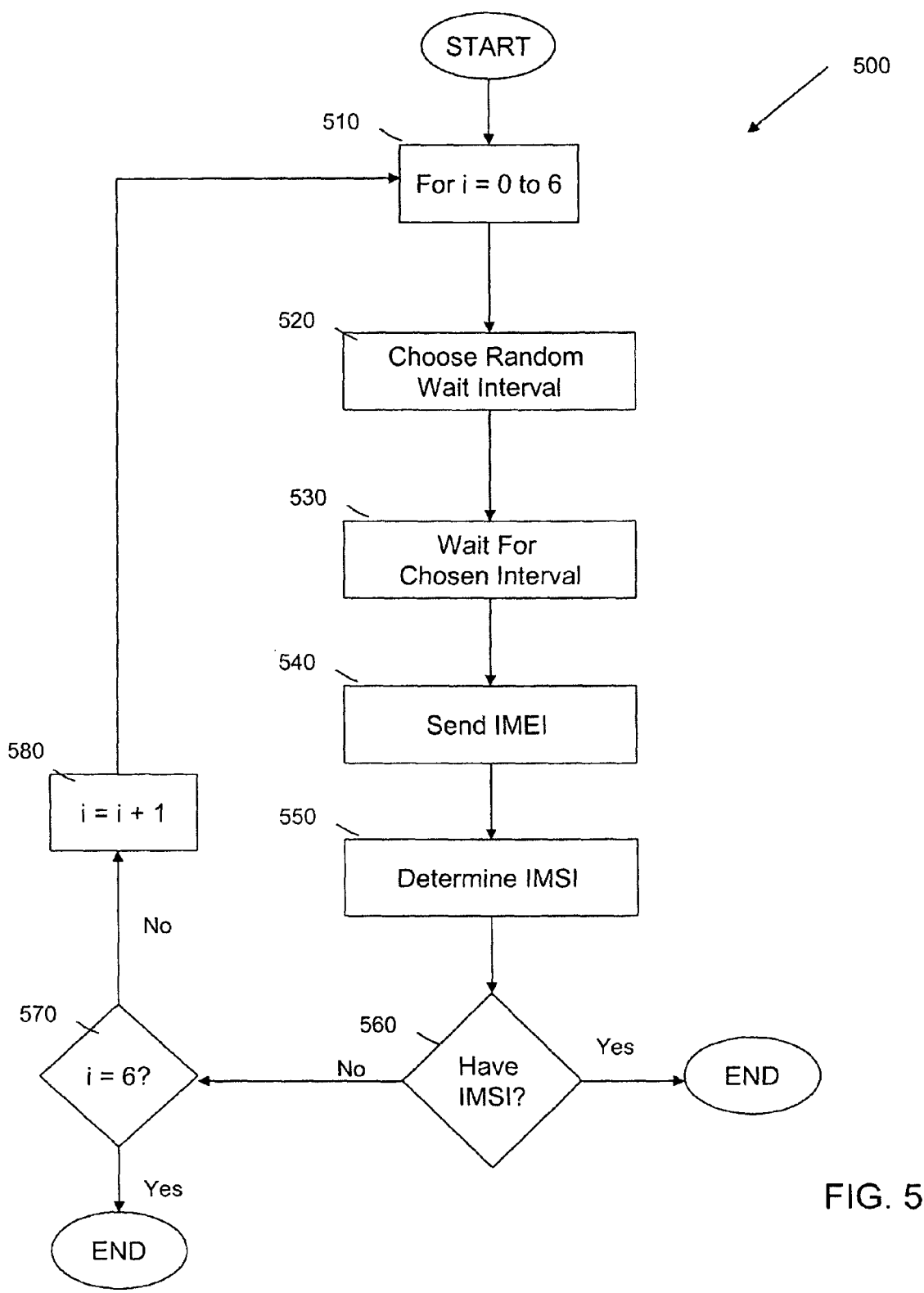
FIG. 5 is a flow diagram for another embodiment of how the IMEI registration process may be performed consistent with the principles of the invention.

Referring now to FIG. 5, depicted is another embodiment of a process 500 for implementing the back-off procedure discussed above. In one embodiment, process 500 is implemented by one of the subscriber units 102-106 as part of the IMEI registration process with carrier network 110. Process 500 begins at block 510 wherein a counter, i, is set to go from 0 to 6 in increments of 1 per iteration. For the first iteration (i.e., when i=0), process will immediately send the IMEI to the network (block 515). However, for all subsequent iterations, process 500 will proceed to block 520 where a random integer may be chosen. This value will then serve as the wait time before the subscriber unit in question attempts to send its IMEI to the network (block 530). Once the designated wait time has elapsed, process 500 will move to block 540 where the subscriber unit will once again transmit its IMEI. Thereafter, at block 550 the network will determine the IMSI that is to be associated with the particular subscriber unit. Process 500 may then make the determination at block 560 as to whether an IMSI was successfully obtained from the network. If so, then the registration process is complete and process 500 ends. If no IMSI was obtained, however, then loop process 500 will move to block 570 where a determination is made as to whether the counter, i, has reached the predetermined maximum value (e.g., 6). If so, then process 500 ends. In one embodiment, after ending, process 500 may reinitiate and begin again at block 510. If, on the other hand, the counter has not reached the predetermined maximum, then i will be incremented at block 580 and process 500 will revert to block 510. As with the embodiment of FIG. 4, the predetermined maximum value for the counter, i, may be similarly greater than or less than 6.

The following is an example of another embodiment of an IMEI registration back-off process that may be used by one of subscriber units 102-106 when registering with the carrier network 110. In the following example, t denotes the time, in seconds, elapsed since the beginning of subscriber unit's first attempt to register:

1. First attempt at IMEI reg. by subscriber unit (t=0 seconds);
2. Retry second attempted IMEI reg. after 30 sec (t=30 sec);
3. Retry third attempted IMEI reg. after 60 sec (t=90 sec);
4. Retry fourth attempted IMEI reg. after 120 sec (t=210 sec);
5. Retry fifth attempted IMEI reg. after 240 sec (t=450 sec);
6. Retry sixth attempted IMEI reg. after 480 sec (t=930 sec);
7. Retry seventh attempted IMEI reg. after 960 sec (t=1890 sec);
8. Wait 30 seconds and then repeat steps 1-7 (t=1920 seconds).

The following is another example of an IMEI registration back-off process in which the wait time between IMEI registration attempts is determined randomly:

1. First attempted IMEI reg. (t=0 seconds);
2. Choose a random a random time interval in seconds;
3. Retry second attempted IMEI reg. after the time interval so chosen in Step 2;
4. Repeat Step 2 in order to obtain a new time interval value;
5. Retry third attempted IMEI reg. after the time interval so chosen in Step 4;

6. Repeat Step 2 in order to obtain a new time interval value;
7. Retry fourth attempted IMEI reg. after the time interval so determined in Step 6;
8. Repeat Step 2 in order to obtain a new time interval value;
9. Retry fifth attempted IMEI reg. after the time interval so determined in Step 8;
10. Repeat Step 2 in order to obtain a new time interval value;
11. Retry sixth attempted IMEI reg. after the time interval so determined in Step 10;
12. Repeat Step 2 in order to obtain a new time interval value;
13. Retry seventh attempted IMEI reg. after the time interval so determined in Step 12;
14. Repeat Step 2 in order to obtain a new time interval value; and
15. Wait for the time interval so determined in Step 14 and then repeat Steps 1-13.

Although the above examples have been described in connection with a particular back-off procedure, it should be noted that the back-off procedure can differ from what is discussed above. Any back-off procedure will be acceptable provided it changes the conventional retry protocol in a manner designed to reduce network traffic as a whole. Moreover, although the present invention has been described in connection with elements of an iDEN subscriber unit and an iDEN system, the present invention is equally applicable to IMEI registration in other networks.

Conventional subscriber unit IMEI registration is retried every 25-35 seconds until the subscriber unit successfully performs IMEI registration, approximately 64 IMEI registration requests will be performed in a 32-minute (1920 seconds) timeframe. The advantage of the IMEI registration back-off algorithm is that in a 32-minute timeframe, an iDEN mobile station will only attempt to send 8 IMEI registration requests to the iDEN carrier's network, which results in a 75% reduction in network traffic between the iDEN Dispatch Call Controller (i.e., DAP) and the iDEN Home Location Register (iHLR). The reduction in network traffic between the DAP and the iHLR will significantly reduce the possibility of the iDEN network becoming congested with IMEI registrations.

While the invention has been described in connection with various embodiments, it will be understood that the invention is capable of further modifications. This application is intended to cover any variations, uses or adaption of the invention following, in general, the principles of the invention, and including such departures from the present disclosure as, within the known and customary practice within the art to which the invention pertains.

What is claimed is:

1. A method of registering a subscriber unit with a network, the method comprising the acts of:
    transmitting an equipment identifier over a first network;
    determining if a subscriber identifier has been received in response to said transmitting act based on a receipt of a network failure message from said first network, and, if not;
    determining a wait period in response to said receipt of the network failure message based on a number of previous attempts to register said subscriber unit with the first network; and
    re-transmitting said equipment identifier over the first network after said wait period has elapsed,
    wherein said wait period increases with each attempt to register over said first network, and wherein said subscriber will continue to attempt to register for a predetermined number of attempts.

2. The method of claim 1, wherein said network is an Integrated Digital Enhanced Network, and wherein transmitting the equipment identifier comprises transmitting an International Mobile Equipment Identifier over the network.

3. The method of claim 1, wherein said network is an Integrated Digital Enhanced Network, and wherein determining if the subscriber identifier has been received comprises determining if an International Mobile Subscriber Identifier has been received in response to said transmitting the equipment identifier.

4. The method of claim 1, further comprising reducing an amount of network traffic over said network caused by said registering of the subscriber unit.

5. The method of claim 1, wherein said wait period reduces network traffic over said network during said registering of the subscriber unit with said equipment identifier.

6. The method of claim 1, further comprising re-transmitting the equipment identifier until the subscriber unit is registered with the network.

7. A communication network, comprising:
    a base station;
    a subscriber unit in wireless communication with said base station, wherein in order to register with said communication network, the subscriber unit:
        transmits an equipment identifier to the network,
        determines if a subscriber identifier has been received in response to the equipment identifier based on the receipt of a network failure message from said network in response to the transmission of the equipment identifier to the network, and if not,
        determines a wait period in response to receiving the network failure message based on a number of previous attempts to register said subscriber unit with the network, and
        re-transmits said equipment identifier over the network after said wait period has elapsed,
        wherein said wait period increases with each attempt to register with said network, and wherein said subscriber will continue to attempt to register with said network for a predetermined number of attempts.

8. The system of claim 7, wherein said network is an Integrated Digital Enhanced Network, and said equipment identifier is an International Mobile Equipment Identifier.

9. The system of claim 7, wherein said network is an Integrated Digital Enhanced Network, and wherein said subscriber identifier is an International Mobile Subscriber Identifier.

10. The system of claim 7, wherein said wait period reduces network traffic over said network caused by said subscriber unit registering with said network with said equipment identifier.

11. The communication network of claim 7, wherein the subscriber unit is further configured to re-transmitting the equipment identifier until the subscriber unit is registered with the communication network.

12. A method of registering a subscriber unit with a network, the method comprising the acts of:
    transmitting an equipment identifier wirelessly to a first network for a plurality of registration attempts, wherein said plurality of registration attempts is equal to the lesser of a number of equipment identifier transmissions needed to register said subscriber unit, and a predetermined number of times;

receiving a network failure message from the first network in response to said transmitting act;

determining if a subscriber identifier has been received from the first network in response to said transmitting the equipment identifier for each of said plurality of registration attempts; and determining a wait period between each of said plurality of registration attempts with said first network on a random basis in response to said receiving the network failure message.

13. The method of claim 12, wherein said network is an Integrated Digital Enhanced Network, and wherein transmitting the equipment identifier comprises transmitting an International Mobile Equipment Identifier.

14. The method of claim 12, wherein said network is an Integrated Digital Enhanced Network, and wherein determining if a subscriber identifier has been received comprises determining if an International Mobile Subscriber Identifier has been received in response to said transmitting the International Mobile Equipment Identifier for each of said plurality of registration attempts.

15. The method of claim 12, further comprising reducing an amount of network traffic over said network caused by said registering of the subscriber unit.

16. The method of claim 12, wherein said wait period reduces network traffic over said network during said registering of the subscriber unit.

17. The method of claim 12, further comprising re-transmitting the equipment identifier until the subscriber unit is registered with the network.

\* \* \* \* \*